(12) United States Patent
Scott

(10) Patent No.: US 6,380,645 B1
(45) Date of Patent: Apr. 30, 2002

(54) CAST MOTOR END SHIELD INCLUDING INSERT AND METHOD FOR CASTING

(75) Inventor: James M. Scott, Ft. Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/568,737

(22) Filed: May 11, 2000

(51) Int. Cl.⁷ .................................................. H02K 1/12
(52) U.S. Cl. .......................................... 310/42; 310/89
(58) Field of Search ............................. 310/89, 91, 90, 310/42, 258; 29/596–598

(56) References Cited

U.S. PATENT DOCUMENTS

| | | | |
|---|---|---|---|
| 4,186,319 A | 1/1980 | Dochterman | |
| 4,233,535 A | * 11/1980 | Barone | 310/256 |
| 4,319,150 A | 3/1982 | Roddy et al. | |
| 4,557,041 A | * 12/1985 | White et al. | 29/596 |
| 4,644,204 A | 2/1987 | Lakin | |
| 4,645,361 A | 2/1987 | Lakin | |
| 4,801,831 A | * 1/1989 | Lewis | 310/91 |
| 5,430,931 A | * 7/1995 | Fisher et al. | 29/595 |
| 5,739,615 A | * 4/1998 | McClelland | 310/186 |
| 5,929,545 A | 7/1999 | Lakin | |

* cited by examiner

Primary Examiner—Tran Nguyen
(74) Attorney, Agent, or Firm—Karl Vick, Esq.; Damian Wasserbauer, Esq.; Armstrong Teasdale LLP

(57) ABSTRACT

A cast end shield includes an opening extending therethrough and an insert at least partially embedded within the end shield at the opening. The end shield also includes a plurality of slots extending to the insert. In one embodiment, the insert is a substantially circular steel insert ring concentric with the opening and oriented such that an inner diameter of the insert ring is exposed from the end shield.

17 Claims, 2 Drawing Sheets

CAST MOTOR END SHIELD INCLUDING INSERT AND METHOD FOR CASTING

BACKGROUND OF THE INVENTION

This invention relates generally to motor end shields, and, more particularly, to cast motor end shields including an insert and a method for casting the end shields.

Motors typically include a housing connecting two end shields, each end shield having an opening therethrough. The housing and end shields surround a stator core having a bore therethrough. A rotor, including a rotor core and a rotor shaft, extend through the stator bore. The rotor shaft extends through the end shield openings. A bearing, positioned at each end shield opening, contacts the rotor shaft and an inner diameter surface of each end shield. If the inner diameter surface is not properly sized, shaped, and oriented, excessive noise, vibration, and wear may result.

Typically, cast end shields (for example, fabricated from aluminum), include a steel insert ring for contacting the bearings. The insert ring is positioned by a mold utilized to cast the end shield. Typically the mold includes a protrusion on one half of a cope and drag casting pattern. The final location of the insert in the casting is a result of the inner diameter tolerance of the insert and the tolerance of the tapered protrusion. Thus, proper placement and orientation of the insert ring is difficult.

BRIEF SUMMARY OF THE INVENTION

In an exemplary embodiment, a cast end shield includes an insert ring and three slots extending to the insert ring. The end shield also includes an opening extending therethrough and the insert ring is oriented at the opening such that an inner diameter of the insert ring is exposed by the opening. The insert ring is a substantially circular steel insert ring concentric with the opening.

A method of fabricating the end shield includes providing a mold comprising a center axis, a rotor projection coaxial with the axis, and a plurality of orienting projections extending from the rotor projection. The insert is oriented around the rotor projection such that the insert contacts the orienting projections. The end shield is cast such that the insert is embedded within the end shield and an inner diameter surface of the insert ring is exposed.

DETAILED DESCRIPTION OF THE INVENTION

Figure 1:
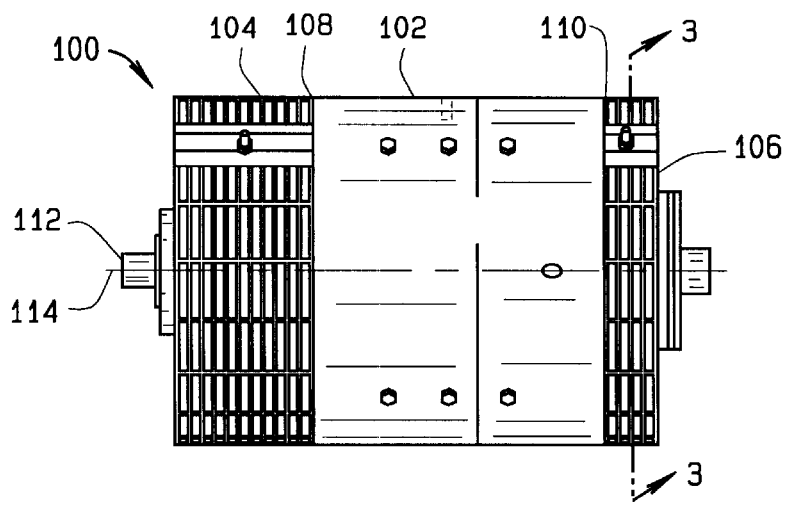
FIG. 1 is a schematic view of a motor including a cast end shield having an insert ring therein.

FIG. 1 is a schematic view of an electric motor 100 including a housing 102, a first end shield 104 and a second end shield 106. End shields 104 and 106 are connected to a pair of ends 108, 110, respectively, of housing 102. Motor 100 also includes a stator core (not shown) enclosed by housing 102 and end shields 104, 106. The stator core includes a bore (not shown) therethrough. A rotor (not shown) including a rotor core (not shown) and a rotor shaft 112 extend through the stator bore. End shields 104 and 106 each include an opening (not shown) through which rotor shaft 112 extends. Motor 100 further includes an axis 114 that extends through rotor shaft 112 and the end shield openings. Rotor shaft 112 is held in place within the end shield openings by two sets of bearings (not shown). One set of bearings contacts end shield 104 and rotor shaft 112 and a second set of bearings contacts end shield 106 and rotor shaft 112.

Figure 2:
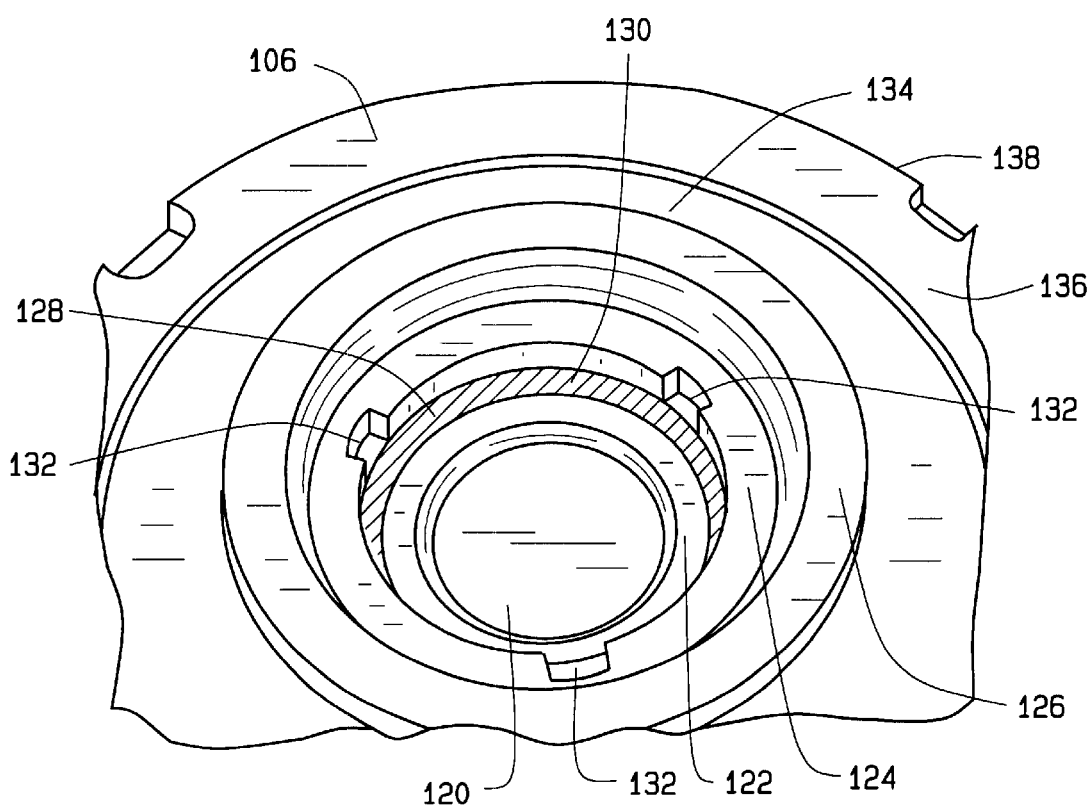
FIG. 2 is a perspective view of one of the end shields shown in FIG 1.

FIG. 2 is a perspective view of a motor end shield, such as motor end shield 106 shown in FIG. 1. In one embodiment, end shield 106 is fabricated from cast aluminum. In alternative embodiments, end shield 106 is fabricated from other metals that have the characteristics sought for end shield 106. End shield 106 includes an opening 120 extending therethrough. End shield 106 also includes a first ledge 122, a second ledge 124, and a third ledge 126. An insert 128 is at least partially embedded within end shield 106. In one embodiment, insert 128 is a substantially circular steel insert ring concentric with opening 120. Insert 128 includes an inner diameter 130 that is fully exposed from end shield 106. In an alternative embodiment, insert inner diameter 130 is partially exposed from end shield 106.

A plurality of slots 132 extend into second ledge 124 such that they extend to insert 128 and expose a portion of insert 128. In one embodiment, end shield 106 includes three slots 132 extending into second ledge 124 and evenly spaced around opening 120. In an alternative embodiment, end shield 106 includes two slots 132 extending into second ledge 124 and evenly spaced around opening 120. In a further alternative embodiment, end shield 106 includes four or more slots 132 extending into second ledge 124 and evenly spaced around opening 120. In a further alternative embodiment, slots 132 are not evenly spaced around opening 120.

End shield 106 also includes a groove 134 extending around third ledge 126. A rim 136 is adjacent groove 134 and extends to an outer perimeter 138 of end shield 106.

Figure 3:
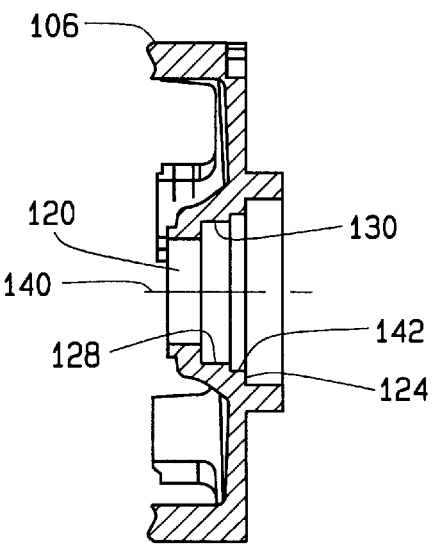
FIG. 3 is a cross sectional view of the end shield shown in FIG. 1 along line 3—3; and y

FIG. 3 is a cross sectional view of end shield 106. End shield 106 includes a center axis 140. Opening 120 is coaxial with axis 140. Insert 128 is embedded within end shield 106 such that inner diameter 130 is exposed from end shield 106. A set of bearings (not shown) contacts insert inner diameter 130. A machined groove 142 extends between second ledge 124 and insert 128. Machined groove 142 is configured to retain a snap ring (not shown) for maintaining the set of bearings positioned at insert 128.

Figure 4:
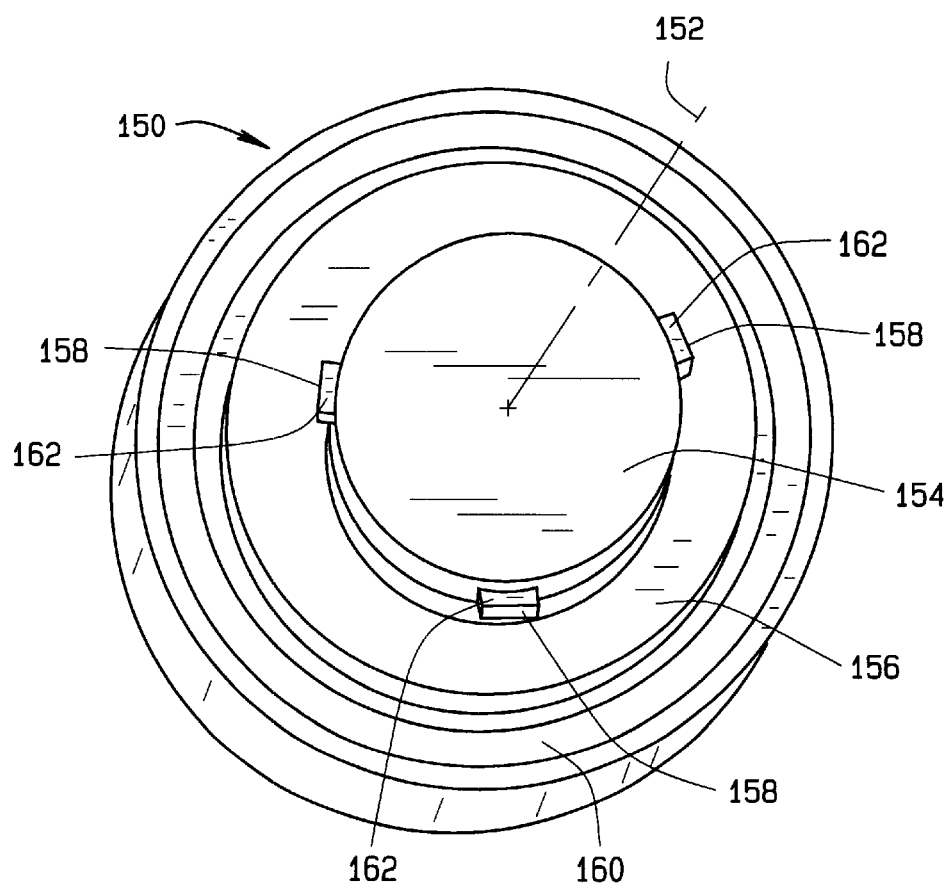
FIG. 4 is a perspective view of an exemplary mold bottom portion utilized to case end shield shown in FIG. 1.

FIG. 4 is a perspective view of an exemplary bottom mold portion 150 for casting end shield 106 (shown in FIGS. 1–3). Mold portion 150 includes an axis 152, a first projection 154 coaxial with axis 152, a second projection 156 coaxial with first projection 154, and a plurality of third projections 158 extending from first projection 154. In one embodiment, mold portion 150 includes three third projections 158 which extend radially outward from first projection 154. In a furher embodiment, mold portion 150 is fabricated from sand. Mold portion 150 further includes a ridge 160 that extends around second projection 156.

A method for fabricating a part, such as motor end shield 106 (shown in FIGS. 1–3), with an insert, such as insert 128 (shown in FIGS. 1–3) embedded at least partially therein includes the step of providing a mold portion 150 including a center axis 152, a first projection 154 coaxial with axis 152, and a plurality of third projections 158 extending from first projection 154. Third projections 158 extend radially outward from first projection 154.

Insert 128 is oriented around first projection 154 such that insert 128 contacts third projections 158. In one embodiment, insert 128 rests on a top surface 162 of third projections 158. Mold portion 150 is then assembled with a second mold portion (not shown) such that a cavity is formed with insert 128 contained therein. A liquid cast material is then introduced into the mold cavity. In one embodiment, the cast material is aluminum. In alternative embodiments, the cast material is another metal suitable for use as an end shield.

End shield 106 is cast such that the insert is embedded at least partially within said part. In one embodiment, insert 128 is a substantially circular steel insert ring which is oriented such that the ring contacts third projections 158. End shield 106 is cast such that inner diameter 130 of insert 128 is exposed from end shield 106 after end shield 106 has been cast. Opening 120 is machined to provide a smooth inner surface for the bearing to contact. In addition, a snap ring groove (not shown) is machined adjacent insert 128 to provide a location for a snap ring to retain the bearing in contact with insert 128.

The above described end shield is fabricated with an embedded insert ring that is precisely oriented prior to casting of the end shield. The proper orientation of the inset prior to casting decreases machining costs and increases the longevity of the end shield.

While the invention has been described in terms of various specific embodiments, those skilled in the art will recognize that the invention can be practiced with modification within the spirit scope of the claims.

What is claimed is:

1. An end shield for a motor, said end shield comprising:
    a center axis;
    an opening extending therethrough coaxial with said axis;
    an insert at least partially embedded within said end shield; and
    a plurality of slots extending to said insert.
2. An end shield in accordance with claim 1 wherein said insert comprises a substantially circular steel insert ring concentric with said opening.
3. An end shield in accordance with claim 1 wherein said end shield comprises aluminum.
4. An end shield in accordance with claim 1 wherein said end shield further comprises a first ledge, a second ledge, and a third ledge, said slots extending into said second ledge.
5. An end shield in accordance with claim 1 wherein said insert comprises an inner diameter, at least a portion of said inner diameter exposed from said end shield.
6. An end shield in accordance with claim 1 wherein each said slot exposes a portion of said insert.
7. An end shield in accordance with claim 1 wherein said plurality of slots comprises three slots.
8. An end shield in accordance with claim 1 wherein said slots are substantially evenly spaced around said opening.
9. An end shield in accordance with claim 1 further comprising a machined groove adjacent said insert.
10. An electric motor comprising:
    a first end shield having an opening therethrough;
    a second end shield comprising an opening therethrough and an insert embedded at least partially within said second end shield, said second end shield further comprising a plurality of slots extending to said insert;
    a housing connected to said first and second end shields;
    a stator core within said housing, said stator core comprising a bore therethrough; and
    a rotor within said stator bore, said rotor comprising a core and a shaft, said shaft extending through said end shield openings.
11. A motor in accordance with claim 10 wherein said insert comprises a substantially circular steel insert ring concentric with said second end shield opening, said rotor shaft extending through said insert ring.
12. A motor in accordance with claim 10 further comprising a bearing configured to contact said insert ring.
13. A motor in accordance with claim 10 wherein said second end shield further comprises a first ledge, a second ledge, and a third ledge, said slots extending into said second ledge.
14. A motor in accordance with claim 10 wherein said insert comprises an inner diameter, at least a portion of said inner diameter exposed from said second end shield.
15. A motor in accordance with claim 10 wherein each said slot exposes a portion of said insert.
16. A motor in accordance with claim 10 in said plurality of slots comprise three slots substantially evenly spaced around said second end shield opening.
17. A motor in accordance with claim 10 wherein said second end shield further comprises a machined groove adjacent said insert.

* * * * *